(12) United States Patent
Imano et al.

(10) Patent No.: US 7,547,188 B2
(45) Date of Patent: Jun. 16, 2009

(54) NI-BASED ALLOY MEMBER, METHOD OF PRODUCING THE ALLOY MEMBER, TURBINE ENGINE PART, WELDING MATERIAL, AND METHOD OF PRODUCING THE WELDING MATERIAL

(75) Inventors: Shinya Imano, Hitachi (JP); Hiroyuki Doi, Hitachi (JP); Kunihiro Ichikawa, Hitachi (JP); Katsumi Tanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 11/356,043

(22) Filed: Feb. 17, 2006

(65) Prior Publication Data
US 2009/0123290 A1    May 14, 2009

(30) Foreign Application Priority Data
Apr. 15, 2005    (JP)    ............................. 2005-117655

(51) Int. Cl.
*F01D 25/00*    (2006.01)
(52) U.S. Cl. .................... 415/200; 416/241 R; 420/447; 420/448; 420/449; 420/450; 420/451; 148/428
(58) Field of Classification Search ................. 415/200; 416/241 R, 241 A; 420/445, 446, 447, 448, 420/449, 450, 451; 228/119, 155; 148/428; 428/680
See application file for complete search history.

(56) References Cited

U.S. PATENT DOCUMENTS

| 6,210,635 | B1 * | 4/2001 | Jackson et al. | ............... 420/445 |
| 6,302,649 | B1 * | 10/2001 | Mukira et al. | ............... 415/200 |
| 6,354,799 | B1 * | 3/2002 | Mukira et al. | ............... 415/200 |
| 7,165,325 | B2 * | 1/2007 | Imano et al. | ............... 29/889.1 |

FOREIGN PATENT DOCUMENTS

| EP | 1 090 711 | 4/2001 |
| EP | 1 410 872 | 4/2004 |
| GB | 583 845 | 1/1947 |
| JP | 10-317079 | 12/1998 |
| JP | 2001-123237 | 5/2001 |
| JP | 2001-158929 | 6/2001 |
| JP | 2004-136301 | 5/2004 |

* cited by examiner

*Primary Examiner*—Ninh H Nguyen
(74) *Attorney, Agent, or Firm*—Mattingly & Malur, PC

(57) ABSTRACT

A Ni-based alloy member has resistance against grain boundary fracture, fatigue strength, and oxidation resistance at temperatures near 1000° C. or higher. The Ni-based alloy member includes a non-repaired region made of a Ni-based alloy base and a region repaired by welding, which is formed on the non-repaired region and which is made of a buildup-welded layer, the buildup-welded layer being made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si, the balance of the alloy being preferably essentially made of Ni.

13 Claims, 5 Drawing Sheets

OXIDATION THINNING

MATERIAL OF INVENTION (T0)

NI-BASED ALLOY MEMBER, METHOD OF PRODUCING THE ALLOY MEMBER, TURBINE ENGINE PART, WELDING MATERIAL, AND METHOD OF PRODUCING THE WELDING MATERIAL

BACKGROUND OF THE INVENTION

1. Field of the Invention

The present invention relates to a novel Ni-based alloy member, a method of producing the alloy member, and a turbine engine part using the alloy member. Also, the present invention relates to a welding material and a method of producing the welding material.

2. Description of the Related Art

Because high-temperature parts of a gas turbine are exposed to high-temperature gas at 1000° C. or more, those parts are susceptible to cracks caused by thermal fatigue and thinning caused by oxidation, erosion, etc. A Ni-based superalloy used in the high-temperature parts of the gas turbine is superior in high-temperature strength, but it is poor in weldability. In particular, a rotor blade having very high strength has been regarded as impossible to make repair by welding. However, even such a rotor blade has recently become possible to repair with progress of the welding technology and development of welding materials disclosed in Patent Documents 1, 2 and 3 (JP,A 2001-123237, JP,A 2001-158929, and JP,A 2004-136301).

SUMMARY OF THE INVENTION

A portion of a gas turbine rotor blade, which requires repair, is exposed to severe environments. Unless a welding metal has characteristics comparable or superior to those of a base material, the life of the repaired portion is very short. In general, however, the high-temperature strength of the welding metal is lower than that of a precision casting material. The inventors have conducted detailed researches regarding the metal structure of a welding material made of a high-strength N-based alloy, and have gained the findings as follows.

The welding metal is solidified at a higher speed than a rotor blade material produced by precision casting and therefore has a different structure from the rotor blade material. In the precision casting material with a low solidification speed, C, Ta, Nb, Ti, etc. are segregated in the dendrite boundary and the crystal boundary. In the segregated portion, γ' phases ($Ni_3(Al, Ti)$) and MC carbides $(Ta, Ti)C$ stabilized by Ti are precipitated to serve as resistance against the progress of cracks caused by boundary fracture. Further, under the condition exposed to high temperatures, the precipitates formed in the crystal boundary also serve to resist against shift of the crystal boundary and to maintain the dendrite crystal boundary formed during the solidification.

Comparing with the linear crystal boundary, the dendrite crystal boundary exhibits higher resistance against cracks, i.e., boundary fracture. On the other hand, in the welding material, the solidification speed is high and the solidification segregation is less caused. Therefore, stable precipitates are hard to precipitate in the crystal boundary and no resistance against the boundary fracture is developed. In addition, because the crystal boundary tends to easily shift and to become linear under exposure to high temperatures, cracks caused by the boundary fracture are much easier to progress in the welding material than in the precision casting material.

For those reasons, the welding metal is easier to cause boundary cracks and has lower fatigue strength at high temperatures than the precision casting material. Also, because the precision casting material is produced through smelting and casting steps in a vacuum, the oxygen content can be easily held not more than 10 ppm. In the welding metal, however, it is difficult to hold the oxygen content not more than 10 ppm even though the welding metal is protected by inert gas during the welding. The higher oxygen content reduces the oxidation resistance and hence increases the amount of oxidation thinning of the welding material at high temperatures in comparison with that of the precision casting material.

Patent Documents 1 and 2 are intended to maintain the dendrite structure during solidification by adding high-melting-point metals, e.g., W, Mo and Ta, in large amount such that compounds with the added high-melting-point metals are precipitated in the crystal boundary or crystal grains and diffusion of elements are suppressed with addition of the high-melting-point metals. As a result, relatively superior high-temperature strength can be obtained in the welding material. However, the oxidation resistance has to be further increased when the welding material is used at temperatures near 1000° C. or higher.

Further, in Patent Document 1, characteristics are improved by adding the high-melting-point metals in large amount, and the amounts by which the high-melting-point metals require to be added are expressed as a total amount of the high-melting-point metals added. However, the influences of W, Ta and Mo upon the solidification structure and the oxidation resistance differ to a large extent for each of the elements. In order to obtain more superior characteristics at high temperatures, therefore, the amounts of the high-melting-point metals added have to be made optimum for each element. In Patent Document 2, Ta tending to deteriorate the oxidation resistance is added in large amount. This means that an improvement of the oxidation resistance is required when the welding material is used at temperatures near 1000° C. or higher.

In Patent Documents 1 and 2, the alloy components are selected based on the results of experiments using a unidirectionally solidified material. However, the welding metal differs in the solidified form and the oxygen content from the unidirectionally solidified material. This means the necessity of extracting a sample from a weld and evaluating it.

In Patent Documents 1 and 2, an upper limit of the amount of added Al is specified respectively to 1.3% and 0.7%, and a rotor blade is repaired at room temperature. Certainly, weldability is deteriorated if the amount of added Al exceeds those upper limits.

In Patent Document 3, Co is added in large amount of not less than 18%, and a welding material is produced in the form of powder because of a difficulty in forming it as a wire. Accordingly, the oxygen content is increased in a buildup-welded portion and the oxidation resistance is low.

An object of the present invention is to provide a Ni-based alloy member, a method of producing the alloy member, a turbine engine part using the alloy member, a welding material, and a method of producing the welding material, which are capable of increasing resistance of a welding material against grain boundary fracture, fatigue strength, and oxidation resistance at high temperatures of not lower than 1000° C.

The present invention resides in a Ni-based alloy member including a non-repaired region made of a Ni-based alloy base and a region repaired by welding, which is formed on the non-repaired region and made of a buildup-welded layer, the buildup-welded layer being made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si, the balance of the alloy being preferably essentially made of Ni.

Preferably, the buildup-welded layer has any of a layer having oxidation resistance, a layer having fatigue resistance, and a layer having oxidation resistance and formed on the layer having fatigue resistance. In particular, the buildup-welded layer is a layer having oxidation resistance and made of a Ni-based alloy containing, by weight, 1-15% of Co, 18-22% of Cr, 0.8-2.0% of Al, 0.5% or less of Ta, 13-18% of W, 0.05-0.13% of C, 0.015% or less of B, 0.4-1.2% of Mn, and 0.1-0.3% of Si. As an alternative, the buildup-welded layer is a layer having fatigue strength and made of a Ni-based alloy containing, by weight, 1-15% of Co, 18-22% of Cr, 0.8-2.0% of Al, 2.5-5.0% of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si. The balance of the alloy is preferably essentially made of Ni.

The buildup-welded layer has an oxygen content of 30 ppm or less, preferably 1-25 ppm. The non-repaired region preferably contains, by weight, 14-18% of Cr, 2.5-4.5% of Al, 7-11% of Co, 1.0-2.5% of Mo, 2.5-6.0% of Ti, 1.0-4.0% of Ta, 0.005-0.003% of B, and 0.05-0.15% of C, and contains Ni as a main component.

Also, the present invention resides in a method of producing a Ni-based alloy member, the method comprising the step of forming a region repaired by welding, which is made of a buildup-welded layer of a Ni-based alloy, on a non-repaired region made of a Ni-based alloy base in an enclosed vessel containing a non-oxidizing atmosphere.

Further, the present invention resides in a method of producing a Ni-based alloy member, the method comprising the step of forming a region repaired by welding, which is made of a buildup-welded layer, on a non-repaired region made of a Ni-based alloy base, the buildup-welded layer being made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si.

Preferably, the producing method includes the step of, after forming the buildup-welded layer, performing aging treatment by holding the buildup-welded layer in a state heated to 1100-1150° C., and thereafter holding the buildup-welded layer in a state heated to 825-875° C. Also, the buildup-welded layer is preferably formed by any of TIG welding, plasma arc welding, and laser welding.

A turbine engine part according to the present invention is formed using the Ni-based alloy member. In the turbine engine part, the Ni-based alloy member is preferably a blade of a gas turbine for power generation, the blade comprising an airfoil portion and a root portion, and the repaired region is included in the airfoil portion. Further, the Ni-based alloy member preferably has a columnar crystal that is unidirectionally solidified and ranges from the airfoil portion to the root portion.

Still further, the present invention resides in a welding material made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.02% or less of B, 0.4-1.2% of Mn, and 0.1-0.3% of Si. Also, the welding material is preferably made of any of the Ni-base alloy having the above-mentioned compositions.

Still further, the present invention resides in a method of producing a welding material, the method comprising the steps of forming a Ni-based alloy ingot containing, by weight, 15% or less of Co, 18-22% of Cr, 0.8-2.0% of Al, 1.5-5.0% of Ta, 0.5% or less of Mo, 0.5% or less of Ti, 13-18% of W, 0.05-0.13% of C, 0.06% or less of Zr, 0.02% or less of B, 0.4-1.2% of Mn, 0.1-0.3% of Si, and the balance being essentially made of Ni through vacuum smelting and casting, and forming the ingot into a bar or wire material through hot plastic working and cold plastic working. In particular, after hot-forging of the ingot, a welding wire is preferably formed through cold drawing. The welding material has an oxygen content of 20 ppm or less, preferably 1-15 ppm.

The following is a description regarding the reasons why the contents of ingredient elements are limited to the above-described ranges in the Ni-based alloy member, the method of producing the alloy member, the turbine engine part, the welding material, and the method of producing the welding material.

The inventors have conducted researches on the influences of high-melting-point metals, i.e., Ta, Mo, W and Nb, upon the solidification structure and the oxidation resistance. Ta, Mo and Nb have a strong tendency to be segregated into the dendrite boundary and the crystal boundary during solidification. On the other hand, a tendency of W to be segregated into the dendrite boundary and the crystal boundary is very weak. Accordingly, adding Ta and Mo is advantageous for the purpose of increasing the amount of the high-melting-point metals in the crystal boundary and strengthening the crystal boundary. In the case of using W, W requires to be added in larger amount than that when the above elements Ta and Mo are added.

However, other elements than W, i.e., Ta, Mo and Nb, tend to reduce the oxidation resistance. From the viewpoint of the oxidation resistance, therefore, it is desired to reduce the amounts of added Ta and Mo to a level as low as possible, and to increase the amount of W. However, if W is added in excess of 18%, there occur not only a reduction of ductility due to excessive precipitation of W carbide, but also precipitation of the detrimental σ phase and excessive precipitation of the μ phase, whereby the creep strength and the fatigue strength are reduced. Accordingly, W should be added in amount of 13-18%, preferably 15-18%.

Mo is similar to W in point of the effect upon the high-temperature strength. Hence Mo can be replaced with W within the range of the W content, but Mo deteriorates the oxidation resistance. To obtain superior oxidation resistance, therefore, it is preferable to add only W without adding Mo. For that reason, when Mo is added, its amount should be 0.5% or less, preferably 0.05-0.2%.

Ta deteriorates the oxidation resistance, but it increases the fatigue strength to a large extent. In the case of welding a portion that requires high fatigue strength, therefore, Ta requires to be added in appropriate amount of 2.5-5.0%. By adding Ta in the range of 2.5-5.0%, the fatigue strength can be obtained at a level comparable to that of a general unidirectionally-solidified rotor blade material. If Ta is added in excess of 5.0%, the oxidation resistance becomes inferior to the general unidirectionally-solidified material, and cold workability is so deteriorated that the welding material cannot be produced in the form of a wire. For those reasons, the amount of added Ta is preferably 5.0% at maximum, but not less than 2.5% to obtain a sufficient level of the fatigue strength. On the other hand, from the viewpoint of obtaining superior oxidation resistance, it is important that Ta be added in amount of 0.5% or less, preferably 0.05-0.3%.

Cr is an important element forming an oxidation resistant film and requires to be added in amount of 18% or more. However, if the amount exceeds 22%, the detrimental phases, such as the σ phase, are precipitated. Hence Cr is added in amount of 18-22%, preferably 19-21%.

Al is an important element in point of increasing the oxidation resistance because it forms an oxidation film giving superior protection at, in particular, high temperatures. Al is therefore added 0.8% or more. However, if Al is added beyond 2.0%, the amount of precipitated $Ni_3Al$ is increased and cracks are more apt to occur during the welding. Also, the precipitation of $Ni_3Al$ deteriorates workability and causes a difficulty in producing the welding material in the form of a wire. In spite of such a tendency, it is not desired to limit the amount of added Al from the viewpoints of weldability and workability because weldability and workability depend on the welding technology and the working technology. The present invention makes much account of repairing a rotor blade, particularly, at room temperature. In such a condition, weldability is certainly deteriorated if the amount of added Al exceeds the above-mentioned upper limit.

By optimizing the amount of incoming heat for the welding or heating a welded portion, however, the welding can be performed to further increase the oxidation resistance without causing weld cracks even when the amount of added Al exceeds the above-mentioned upper limit. Nevertheless, adding Al in amount beyond 2.0% forms Al nitrides at high temperatures and deteriorates ductility of a surface layer. For that reason, the amount of added Al is usually limited to the range of 0.8-2.0% in which no Al nitrides are formed in the surface layer. A preferable range of the amount of added Al is 1.0-1.5%.

Al and W are correlated with each other. An (Al/W) ratio is preferably 0.06-0.15. By setting the (Al/W) ratio to fall in that range, the high-temperature strength and the oxidation resistance can be ensured at a high level. A more preferable range of the (Al/W) ratio is 0.07-0.10.

Co slightly contributes to increasing the strength as a result of solid solution strengthening. However, if Co is added in excessive amount, precipitation of the p phase, the C phase, etc. is promoted. Accordingly, the amount of added Co should be 15% or less. In particular, a preferable range is 2-13%.

Mn and Si act to increase the oxidation resistance at high temperatures. Mn is added in the range of 0.4-1.2%, and Si is added in the range of 0.1-0.3%.

Because the oxygen content considerably affects the oxidation resistance, as described above, the oxygen content is preferably held at 20 ppm or less. To that end, it is important to reduce the oxygen content of the welding metallic material. Addition of Mg is effective in reducing the oxygen content. An appropriate Mg content is 0.001-0.01%.

Ti is an element forming the η phase [$Ni_3(Ti.Ta)$] or carbide (such as TiC), similarly to Ta, in such a way that produced layers are formed at the grain boundary, to thereby suppress the progress of grain boundary cracks. But the effect of Ti is smaller than that of Ta. Ti is rather effective in increasing the corrosion resistance of the alloy at high temperatures, and hence it is added in amount of 0.5% or less. However, if Ti is added in excess of 0.5%, castability and weldability are deteriorated. For that reason, an upper limit is 0.5%. A preferable range of the Ti content is 0.05-0.2%.

C and B are elements used for strengthening the grain boundary in common cast alloys and unidirectionally-solidified columnar alloys that have hitherto been employed. In the single-crystalline alloy, these grain-boundary strengthening elements are not required and rather become detrimental elements in production of the single-crystalline alloy. However, C and B are effective in a subsequent surface coating process.

In addition, inclusion of these elements is unavoidable. For those reasons, C and B are contained in very small amount.

C forms carbides (such as TiC and TaC) in the welding metal, which are precipitated as masses. Because those carbides have lower melting points than the alloy of the present invention and are locally melted in solid solution treatment that is performed at a temperature just below the melting point of the alloy, the temperature of the solid solution treatment cannot be raised and a temperature range of the solid solution treatment is narrowed. Further, C forms carbide with Ta as a solid solution strengthening element, whereby the apparent content of Ta used for the solid solution strengthening is reduced and the creep strength at high temperatures is deteriorated. For those reasons, C is added in amount of 0.05-0.13%. In particular, a preferable range is 0.04-0.1%.

B forms borides [$(Cr, Ni, Ti, Mo)_3B_2$] which are precipitated at the grain boundary of the alloy. Like the carbides, those borides also have lower melting points than the alloy, thus lowering the temperature of the solid solution treatment and narrowing the temperature range of the solid solution treatment. Therefore, an upper limit of the B content is set to 0.02%. In particular, a preferable range is 0.005-0.015%.

Zr is an element forming carbide (such as ZrC), similarly to Ta, in such a way that a produced layer is formed at the grain boundary, to thereby suppress the progress of grain boundary cracks. But the effect of Zr is smaller than that of Ta. Zr is rather effective in increasing the corrosion resistance of the alloy at high temperatures, and hence it is added in amount of 0.06% or less. However, if Zr is added in excess of 0.06%, castability and weldability are deteriorated. For that reason, an upper limit is 0.06%. A preferable range of the Zr content is 0.01-0.03%.

According to the present invention, it is possible to provide a Ni-based alloy member, a method of producing the alloy member, and a turbine engine part using the alloy member, as well as a welding material and a method of producing the welding material, which are capable of increasing resistance of a welding material against grain boundary fracture, fatigue strength, and oxidation resistance at high temperatures of not lower than 1000° C.

DESCRIPTION OF THE PREFERRED EMBODIMENTS

The best mode for carrying out the present invention will be described below in connection with Examples.

Example 1

Table 1, given below, lists chemical compositions (weight %) of samples. The samples were each prepared as a welding wire with a diameter of about 2 mm through the steps of vacuum smelting, hot forging, and cold drawing. The oxygen content of the welding wire was 5-15 ppm. By employing the welding wire as a welding material, a buildup welded layer was formed on a rotor blade material by the TIG welding process. The rotor blade material was a unidirectionally-solidified columnar Ni-based alloy that contained, by weight, 13.5% of Al, 9.0% of Co, 16.0% of Cr, 1.7% of Mo, 1.4% of Ta, 2.0% of W, 0.10% of C, 0.012% of B, 3.5% of Ti, and 1.0% of Nb. The welding was performed in the lengthwise direction of the columnar crystal. To avoid welding cracks, a welded portion was heated to about 800-950° C. by high frequency heating. Also, to suppress mixing of oxygen into the welded portion during the welding, the welding operation was performed in an enclosed vessel. An atmosphere in the enclosed vessel was sufficiently replaced with high-purity Ar gas prior to start of the operation. A weld metal formed after the welding had the oxygen content of 8-25 ppm. For comparison, a sample H0 was prepared by using, as the welding material, vacuum atomized powder of the Ni-based alloy. The oxygen content of a welded portion in the case of using the vacuum atomized powder was 50-60 ppm. After the welding, aging treatment was performed in two stages of heating at 1125° C. for 2 hours and heating at 850° C. for 24 hours. Then, a plate-like specimen was taken from the welded portion and subjected to a creep rupture test.

and Mo in relatively large amount of 1.8% corresponds to the alloy disclosed in Patent Document 1. Comparing with the disclosed alloy, the material T0 of the invention exhibited equivalent or superior creep rupture strength. It is hence apparent that the material T0 of the invention has higher strength when the test is continued for a longer time.

Figure 2A:
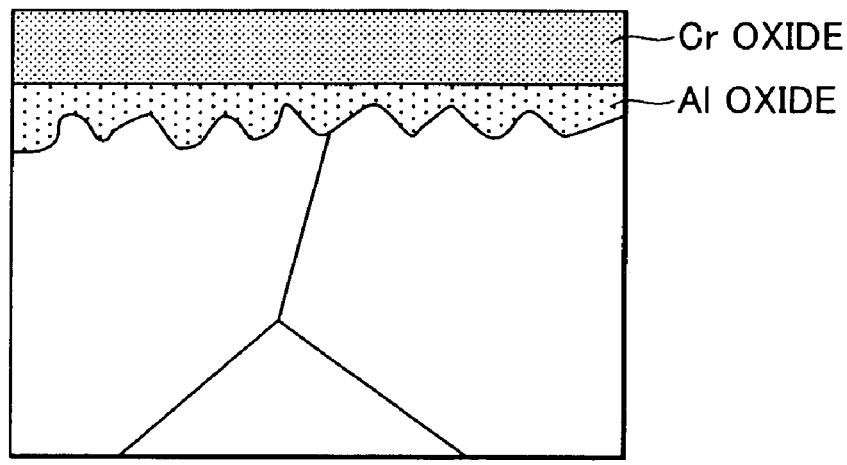
FIGS. 2A and 2B are illustrations showing the results of observing a section of the specimens subjected to the creep rupture test.
Figure 2B:
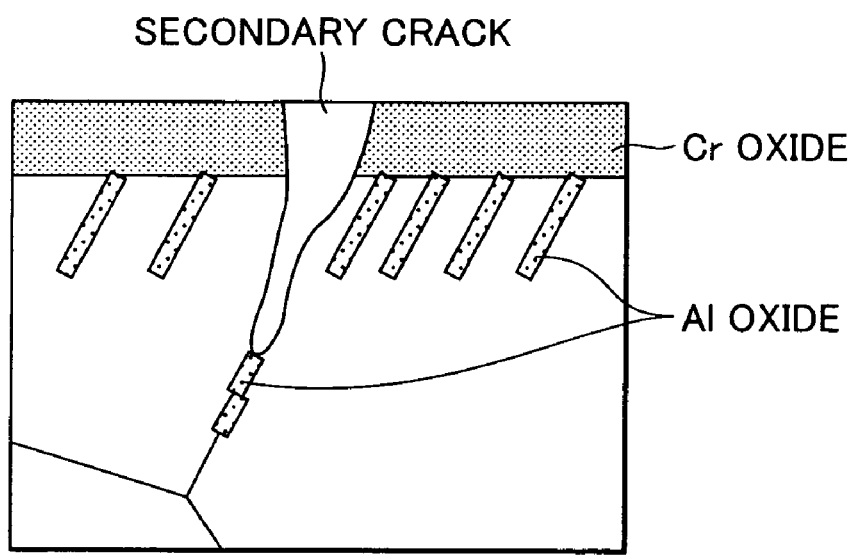

FIGS. 2A and 2B are illustrations showing the results of observing a section of the specimens subjected to the creep rupture test. More specifically, FIG. 2A shows the result of observing a section of each material of the invention after being subjected to the creep rupture test (under temperature of 1050° C. and stress of 19.6 MPa), and FIG. 2B shows the result of observing a section of the comparative material HA when the test was aborted at the time of creep rupture. As shown, in the comparative material HA, Al nitrides were formed at an inner end of a creep secondary crack and on an outer surface. In any of the materials T0-T5 of the invention, such Al nitrides were not formed and an Al-oxide coating was formed on an outer surface.

Figure 3:
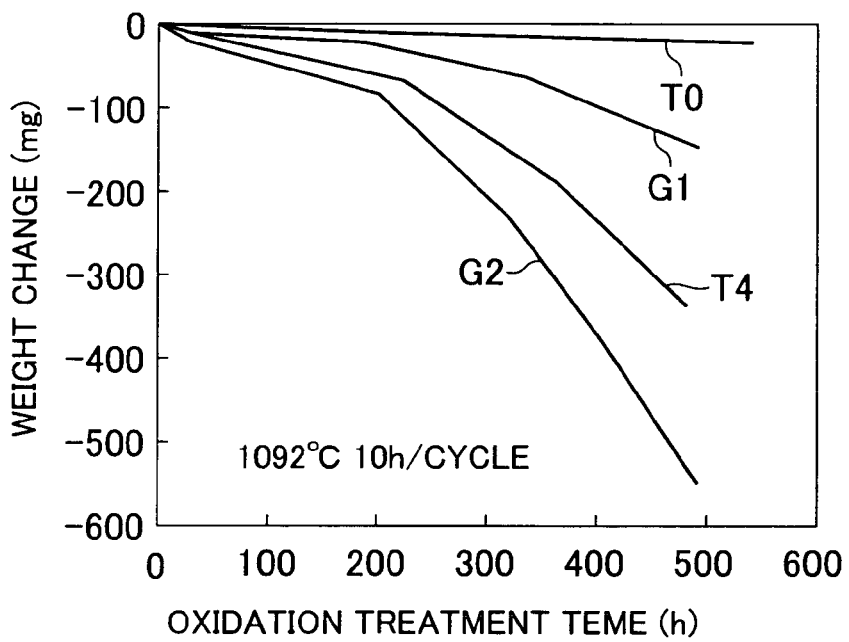
FIG. 3 is a graph showing the results of repeated oxidation tests of the specimens.

FIG. 3 is a graph showing the results of repeated oxidation tests of the specimens of the welding materials. The temperature at which each specimen was held in the repeated oxidation test was 1092° C. The weight of the specimen was measured while repeating cycles of heating the specimen to the holding temperature, air-cooling it to room temperature, and reheating it per 10 hours. Comparing with a comparative material G1 containing W in relatively large amount of 20% and disclosed in Patent Document 2 and with a comparative material G2 containing Mo in relatively large amount of 1.8% and disclosed in Patent Document 1, the material T0 of the invention exhibited superior oxidation resistance. The oxidation resistance of the material T4 of the invention containing Co in larger amount than the material T0 of the invention was slightly inferior to that of the comparative material G1.

TABLE 1

| Main Element | Comparative Material | | | | | Material of invention | | | | |
|---|---|---|---|---|---|---|---|---|---|---|
| | HA | HW | G1 | G2 | H0 | T0 | T2 | T3 | T4 | T5 |
| Al | 3.5 | 1.2 | 0.3 | 0.6 | 1.2 | 1.2 | 1.2 | 1.2 | 1.5 | 1.5 |
| Co | 2 | 2 | 2 | 12 | 2 | 2 | 10 | 13 | 10 | 10 |
| Mn | 0.7 | 0.7 | 0.7 | 0.7 | 0.7 | 0.7 | 0.6 | 0.7 | 0.6 | 0.7 |
| Si | 0.2 | 0.2 | 0.2 | 0.2 | 0.2 | 0.2 | 0.2 | 0.2 | 0.2 | 0.2 |
| Cr | 20 | 20 | 20 | 20 | 20 | 20 | 20 | 20 | 20 | 20 |
| Total of high-melting-point metals | 18 | 22 | 20 | 20.8 | 18 | 17 | 17 | 18 | 19 | 20 |
| Mo | 0 | 0 | 0 | 1.8 | 0 | 0 | 0 | 0 | 0 | 0 |
| Ta | 0 | 0 | 0 | 4 | 0 | 0 | 2 | 3 | 4 | 5 |
| W | 18 | 22 | 20 | 15 | 18 | 17 | 15 | 15 | 15 | 15 |
| C | 0.09 | 0.09 | 0.04 | 0.04 | 0.09 | 0.09 | 0.06 | 0.07 | 0.06 | 0.07 |
| B | 0.01 | 0.01 | 0.01 | 0.01 | 0.01 | 0.01 | 0.02 | 0.01 | 0.02 | 0.01 |
| Ti | 0 | 0 | 0 | 0 | 0 | 0 | 0 | 0 | 0 | 0 |
| O (ppm) | 15 | 15 | 15 | 25 | 55 | 15 | 18 | 10 | 8 | 8 |

Figure 1:
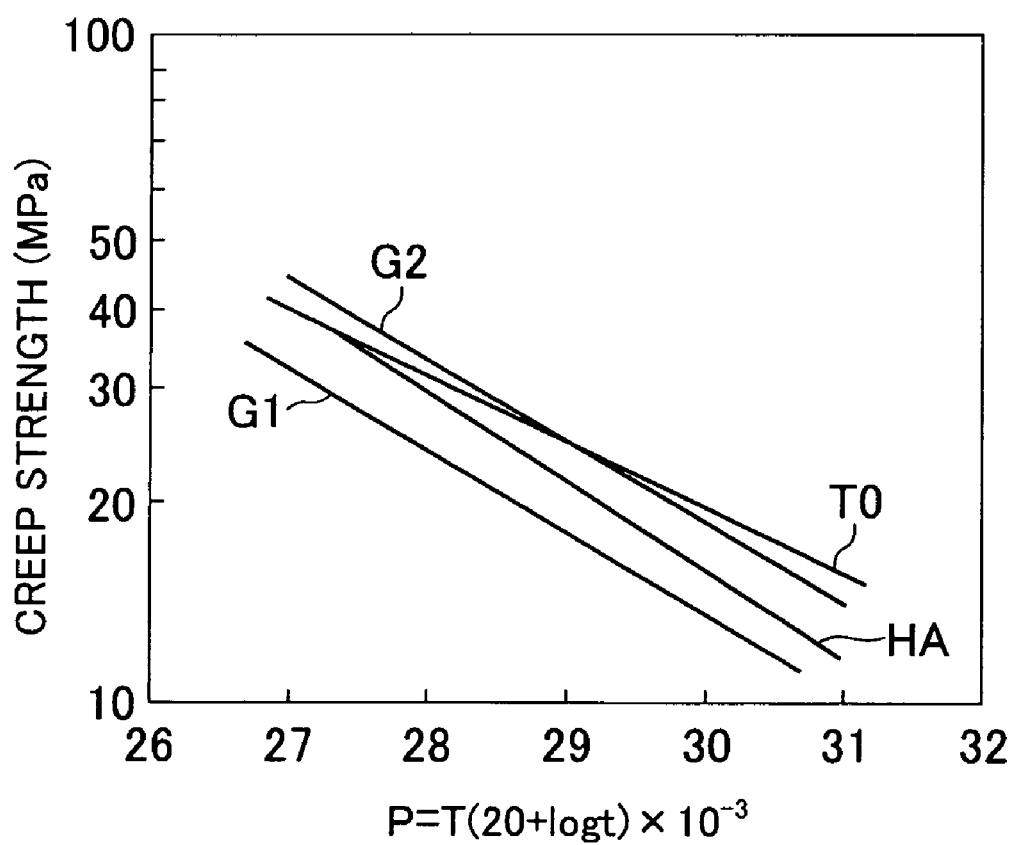
FIG. 1 is a graph showing the results of creep rupture tests of specimens.

FIG. 1 is a graph showing the results of creep rupture tests of specimens at 1050° C., the graph being plotted using a parameter $\{P=T(20+\log t)\times 10^{-3}\}$ in accordance with the Larson-Miller method. T represents the test temperature expressed by absolute temperature, and t represents the rupture time (h). As seen from FIG. 1, a comparative material G1 having a relatively large W content and a comparative material HA having a relatively large Al content had lower creep rupture than a material T0 of the invention. A comparative material G2 containing Al in relatively small amount of 0.6%

Figure 4:
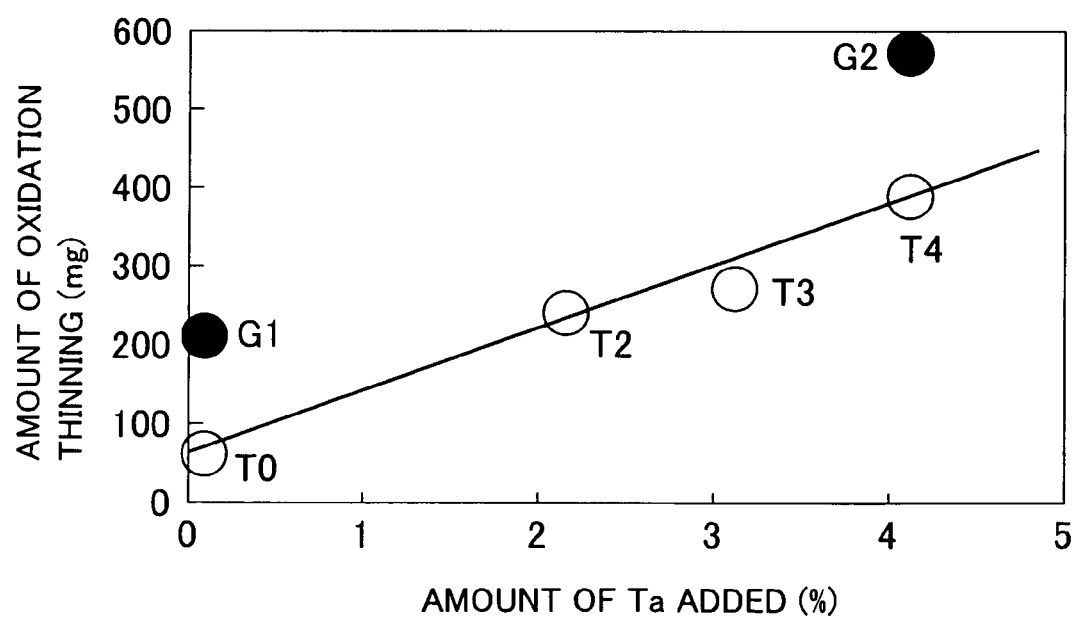
FIG. 4 is a graph showing the relationship between amount of Ta added and amount of oxidation thinning.

FIG. 4 is a graph showing the relationship between amount of Ta added and amount of oxidation thinning after oxidation tests under the same conditions as those in the case of FIG. 3, i.e., 1092° C. and 500 hours. It is apparent from FIG. 4 that, also in the materials of the invention, the larger the amount of Ta added, the larger is the amount of oxidation thinning. However, the amount of oxidation thinning is larger in the comparative materials G1 and G2 than materials of the invention even at the same amount of Ta added.

Figure 5:
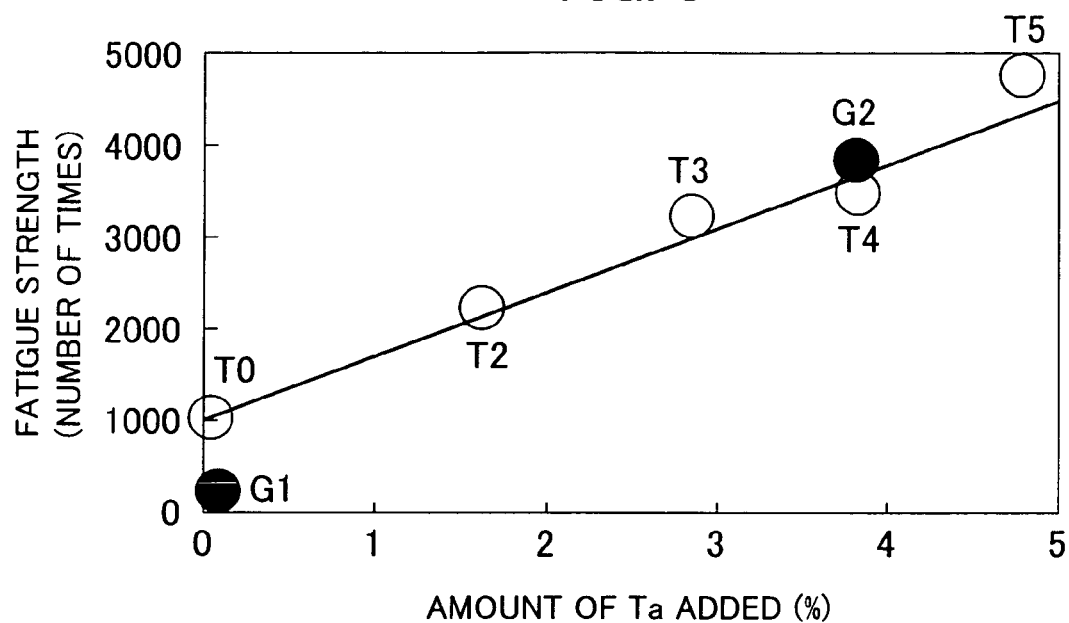
FIG. 5 is a graph showing the relationship between amount of Ta added and fatigue strength.

FIG. 5 is a graph showing the relationship between amount of Ta added and fatigue strength (number of times of ruptures in the strain range of 0.5%) at 900° C. It is apparent from FIG. 5 that, in both of the comparative materials and the materials of the invention, the fatigue strength is increased with an increase in the amount of Ta added. However, the oxidation resistance is deteriorated with an increase in the amount of Ta added as shown FIG. 4. Referring to FIGS. 4 and 5, the material T4 of the invention exhibits the fatigue strength comparable to that the comparative material G2, while it exhibits superior oxidation resistance to the comparative material G2. This result is attributable to the effect resulting from that Mo impairing the oxidation resistance is not added and Al improving the oxidation resistance is added in larger amount in the material of the invention.

From the results described above, it is apparent that the materials of the invention are superior in the creep rupture strength, the fatigue strength, and the oxidation resistance.

Example 2

In this Example 2, rotor blades in the initial stage used in two plants (A and B) were repaired by welding.

Figure 6:
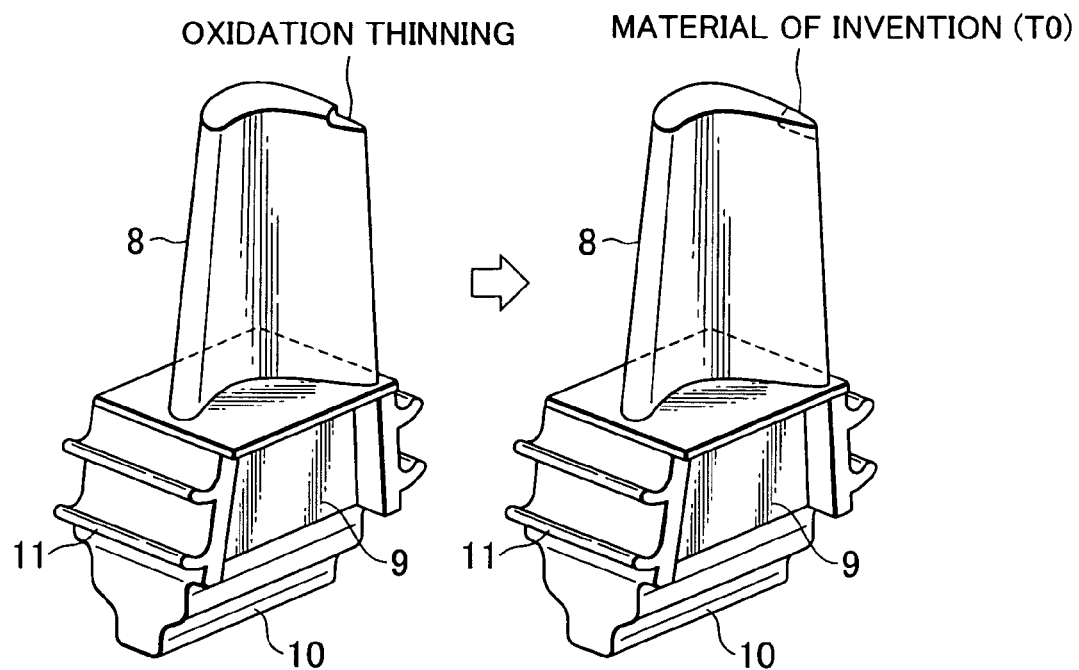
FIG. 6 is a perspective view of a rotor blade actually used in a gas turbine for power generation, which was repaired by welding according to the present invention.

FIG. 6 is a perspective view showing the case where a corner at a tip of the rotor blade actually used in a gas turbine for power generation (plant A), which had been subjected to a relatively small amount of oxidation thinning, was repaired by using the material of the present invention. In the plant A, the operation had been shut down several times per year, and the rotor blade in the initial stage of the plant A was slightly damaged. In consideration of that a longer service life would be expected by using the welding material superior in the oxidation resistance rather than the fatigue strength in such a case, the material T0 of the invention containing no Ta was employed. With oxidation, a corner at a tip of an airfoil portion 8 was subjected to thinning. After cutting that corner by, e.g., grinding or electrical discharge machining, the blade was preheated to 800° C. or higher, buildup welding was performed in plural layers on the cut corner of the airfoil portion 8 with the TIG welding process by using, as the welding material, a welding wire having a diameter of about 2 mm and obtained in Example 1. Prior to start of the welding, a surface treatment layer formed on an entire surface of the airfoil portion 8 by thermal spraying of MCrAlY was removed.

The rotor blade material used in this Example 2 was made of the alloy mentioned above in Example 1 and had a columnar crystal unidirectionally solidified from the airfoil portion 8 toward a dovetail 10. To avoid welding cracks, a welded portion was heated to about 800-950° C. by high frequency heating. Also, to suppress mixing of oxygen into the welded portion during the welding, the welding operation was performed in an enclosed vessel. An atmosphere in the enclosed vessel was sufficiently replaced with high-purity Ar gas prior to start of the operation. A weld metal formed after the welding had an oxygen content of 8-25 ppm. As a result of the welding, several buildup-welded layers were unidirectionally solidified.

After the welding, aging treatment was performed in two stages of heating at 1125° C. for 2 hours, and subsequent heating at 850° C. for 24 hours. Then, the buildup-welded layers were cut into a predetermined shape. Then, a surface treatment layer was formed on the entire surface of the airfoil portion 8 by thermal spraying of MCrAlY. Moreover, the rotor blade in the gas turbine for power generation, used in this Example 2, had four air cooling bores formed therein in an M-shape to extend in the lengthwise direction from the dovetail to the airfoil portion such that cooling air is introduced to the airfoil portion through the dovetail and is returned to the dovetail in a closed system.

Figure 7:
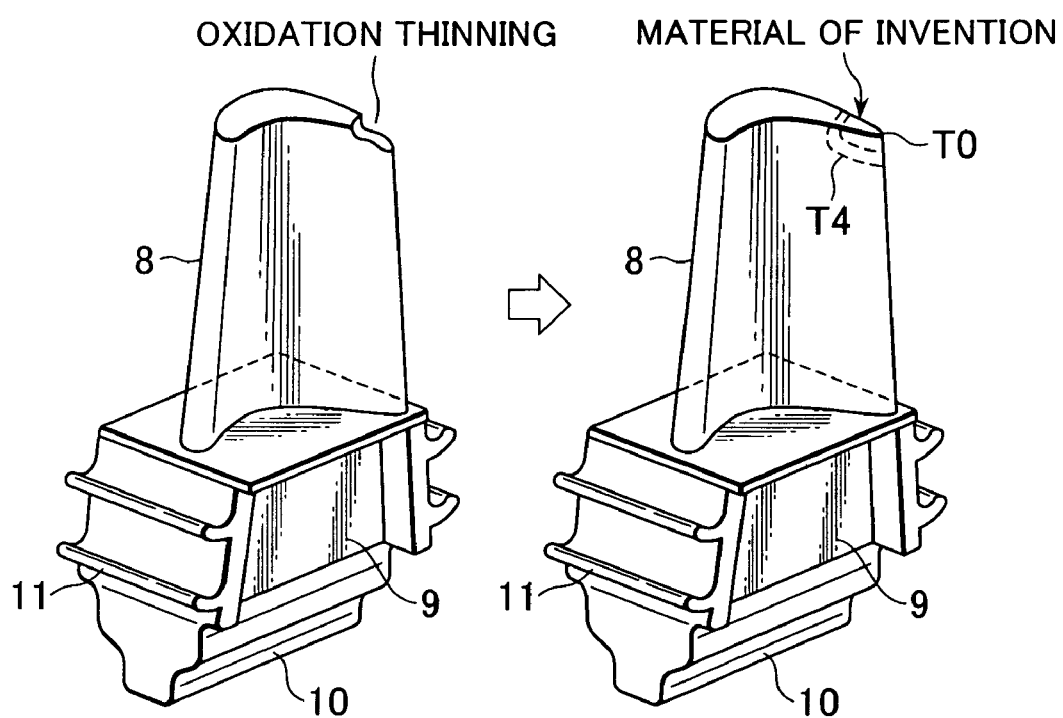
FIG. 7 is a perspective view of another rotor blade actually used in a gas turbine for power generation, which was repaired by welding according to the present invention.

FIG. 7 is a perspective view showing the case where a corner at a tip of the rotor blade actually used in a gas turbine for power generation (plant B), which had been subjected to a relatively large amount of oxidation thinning, was repaired by using the material of the present invention. As with the rotor blade in the plant A, the rotor blade in the plant B had a columnar crystal unidirectionally solidified from an airfoil portion 8 toward a dovetail 10. However, the operation in the plant B had been shut down substantially once per day and a corner at a tip of the airfoil portion 8 was subjected to deep thinning with oxidation. In consideration of the necessity of both the fatigue strength and the oxidation resistance to prolong a longer service life after the repair in such a case, the material T4 of the invention was employed for a portion exposed to large thermal stress and being more apt to cause cracks, and the material T0 of the invention was employed for a portion exposed to small thermal stress, as shown in FIG. 7. After cutting those portions by, e.g., grinding or electrical discharge machining, the blade was preheated in a similar manner in the above case, buildup welding was performed in plural layers with the TIG welding process by using, as the welding material, welding wires each having a diameter of about 2 mm and obtained in Example 1. At the boundary between the welded portions using the materials T4 and T0 of the invention, the amount of Ta was continuously changed from about 4% to 0% due to dilution caused during the welding. After the welding, aging treatment was performed in two stages of heating at 1125° C. for 2 hours, and subsequent heating at 850° C. for 24 hours. Then, the buildup-welded layers were cut into a predetermined shape. Then, a surface treatment layer was formed on the entire surface of the airfoil portion 8 by thermal spraying of MCrAlY. Additionally, the rotor blade in the gas turbine for power generation in this case also had the same cooling structure as that in the above-described case.

In any of the rotor blades shown in FIGS. 6 and 7, the temperature of the portion subjected to the oxidation thinning is very high, and similar thinning occurs again if the buildup-welded layers formed by using the material(s) of the invention are left as they are. For the purpose of lowering the temperature to which the welded portion is exposed, therefore, the welded portion is preferably covered with a ceramic heat-shield coating by plasma electrical spraying of $ZrO_2$-based powder.

Thus, it is understood from Examples that a longer-life rotor blade used in the gas turbine for power generation can be obtained by repairing the blade with welding to form the buildup-welded layers using one or more materials superior in the creep rupture strength, the fatigue strength and the oxidation resistance, thereby prolonging the part life and improving reliability.

What is claimed is:

1. A Ni-based alloy member including a non-repaired region made of a Ni-based alloy base and a region repaired by welding, which is formed on the non-repaired region and made of a buildup-welded layer, the buildup-welded layer being made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si.

2. The Ni-based alloy member according to claim 1, wherein the buildup-welded layer has any of a layer having oxidation resistance, a layer having fatigue resistance, and a layer having oxidation resistance and formed on the layer having fatigue resistance.

3. The Ni-based alloy member according to claim 1, wherein the buildup-welded layer is a layer having oxidation resistance and made of a Ni-based alloy containing, by weight, 1-15% of Co, 18-22% of Cr, 0.8-2.0% of Al, 0.5% or less of Ta, 13-18% of W, 0.05-0.13% of C, 0.015% or less of B, 0.4-1.2% of Mn, and 0.1-0.3% of Si.

4. The Ni-based alloy member according to claim 1, wherein the buildup-welded layer is a layer having fatigue strength and made of a Ni-based alloy containing, by weight, 1-15% of Co, 18-22% of Cr, 0.8-2.0% of Al, 2.5-5.0% of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si.

5. The Ni-based alloy member according to claim 1, wherein the buildup-welded layer has an oxygen content of 30 ppm or less.

6. The Ni-based alloy member according to claim 1, wherein the non-repaired region contains, by weight, 14-18% of Cr, 2.5-4.5% of Al, 7-11% of Co, 1.0-2.5% of Mo, 2.5-6.0% of Ti, 1.0-4.0% of Ta, 0.005-0.003% of B, and 0.05-0.15% of C, and contains Ni as a main component.

7. A turbine engine part formed using the Ni-based alloy member according to claim 1.

8. A turbine engine part according to claim 7, wherein the Ni-based alloy member is a blade of a gas turbine for power generation, said blade comprising an airfoil portion and a root portion, and the repaired region is included in said airfoil portion.

9. A turbine engine part according to claim 7, wherein the Ni-based alloy member has a columnar crystal that is unidirectionally solidified and ranges from said airfoil portion to said root portion.

10. A welding material made of a Ni-based alloy containing, by weight, 15% or less of Co, 18-22% of Cr, 0.8-2.0% of Al, 5.0% or less of Ta, 0.5% or less of Mo, 0.5% or less of Ti, 13-18% of W, 0.05-0.13% of C, 0.06% or less of Zr, 0.02% or less of B, 0.4-1.2% of Mn, and 0.1-0.3% of Si.

11. A welding material made of a Ni-based alloy containing, by weight, 1-15% of Co, 18-22% of Cr, 0.8-2.0% of Al, 0.5% or less of Ta, 13-18% of W, 0.05-0.13% of C, 0.02% or less of B, 0.4-1.2% of Mn, and 0.1-0.3% of Si.

12. A welding material made of a Ni-based alloy containing, by weight, 1-15% of Co, 18-22% of Cr, 0.8-2.0% of Al, 2.5-5.0% of Ta, 0.5% or less of Mo, 0.5% or less of Ti, 13-18% of W, 0.05-0.13% of C, 0.06% or less of Zr, 0.015% or less of B, 0.4-1.2% of Mn, and 0.1-0.3% of Si.

13. The welding material according to claim 10, wherein the Ni-base alloy member is a wire material.

* * * * *